(12) United States Patent
Shih et al.

(10) Patent No.: US 7,776,236 B2
(45) Date of Patent: Aug. 17, 2010

(54) INDEX CONTRAST ENHANCED OPTICAL WAVEGUIDES AND FABRICATION METHODS

(75) Inventors: Min-Yi Shih, Niskayuna, NY (US); Thomas Bert Gorczyca, Schenectady, NY (US)

(73) Assignee: General Electric Company, Niskayuna, NY (US)

( * ) Notice: Subject to any disclaimer, the term of this patent is extended or adjusted under 35 U.S.C. 154(b) by 801 days.

(21) Appl. No.: 10/628,181

(22) Filed: Jul. 25, 2003

(65) Prior Publication Data
US 2005/0018988 A1 Jan. 27, 2005

(51) Int. Cl.
*B29D 11/00* (2006.01)
(52) U.S. Cl. ............... 264/1.24; 264/1.36; 264/1.38
(58) Field of Classification Search .......... 264/1.1, 264/1.24, 1.27, 1.36, 1.38
See application file for complete search history.

(56) References Cited

U.S. PATENT DOCUMENTS

| | | | | |
|---|---|---|---|---|
| 3,809,732 | A * | 5/1974 | Chandross et al | 430/321 |
| 4,877,717 | A * | 10/1989 | Suzuki et al. | 430/321 |
| 5,113,470 | A | 5/1992 | Fukushima et al. | |
| 6,624,077 | B2 * | 9/2003 | White | 438/692 |
| 6,828,078 | B2 * | 12/2004 | Nishimura et al. | 430/270.1 |

FOREIGN PATENT DOCUMENTS

| | | |
|---|---|---|
| JP | 08304644 | 11/1996 |
| JP | 09036337 | 2/1997 |
| WO | WO 91/01505 | 2/1991 |

OTHER PUBLICATIONS

F. Zhao, et al, "Optical Elements for Mixing Colored LEDs to Create White Light", Solid State Lighting, Proceedings of SPIE vol. 4778, 2002, pp. 206-214.
International Search Report Dated Dec. 16, 2004.
U.S. Appl. No. 10/306,439, filed Nov. 27, 2002, Entitled "Method for Making Optical Structures" by Thomas B. Gorczyca.
U.S. Appl. No. 10/306,440, filed Jan. 27, 2002, Entitled "Optical Device Structures Based on Photo-Definable Polymerizable Composites" by Min-Yi Shih, et al.

* cited by examiner

*Primary Examiner*—Mathieu D. Vargot
(74) *Attorney, Agent, or Firm*—Ann M. Agosti

(57) ABSTRACT

A method of forming a waveguide including a core region, a cladding region, and an index contrast region situated therebetween includes depositing a polymerizable composite on a substrate to form a layer, patterning the layer to define an exposed area and an unexposed area of the layer, irradiating the exposed area of the layer, and volatilizing the uncured monomer to form the waveguide, wherein the polymerizable composite includes a polymer binder and sufficient quantities of an uncured monomer to diffuse into the exposed area of the layer and form the index contrast region. The resulting waveguide includes an index contrast region which has a lower index of refraction than that of the core and cladding regions.

30 Claims, 13 Drawing Sheets

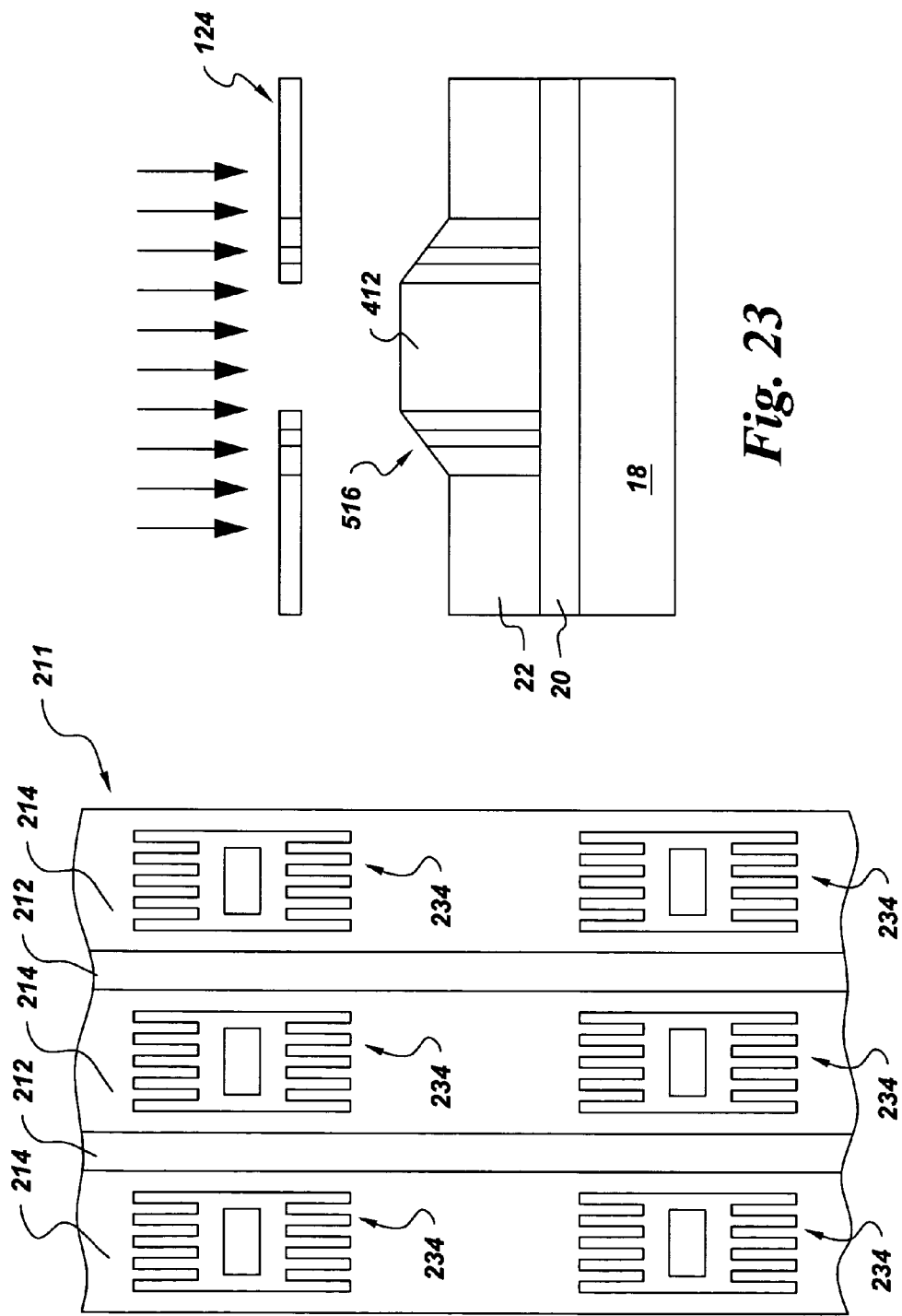

INDEX CONTRAST ENHANCED OPTICAL WAVEGUIDES AND FABRICATION METHODS

BACKGROUND OF INVENTION

The invention relates generally to optical waveguides.

Modern high-speed communications systems are increasingly using optical waveguides including fibers for transmitting and receiving high-bandwidth data. The excellent properties of optical waveguides with respect to flexibility and ease of handling and installation are an important driving force for their implementation in high bandwidth, short-haul data transmission applications such as fiber to the home, local area networks, high-speed computing, and automotive information, diagnostic, and entertainment systems.

In any type of optical communication system there is the need for interconnecting different discrete components. These components may include active devices, such as lasers, detectors, fibers modulators, and switches, for example, and passive devices such as filters and splitters, for example. Polymer-based waveguides offer a viable and potentially inexpensive way of interconnecting these components. Such waveguides should be able to couple light into or out with good efficiency and deliver optical signals with very low propagation losses, which in turn are determined primarily by the quality of the polymer, the waveguide structure, and the device boundary.

A proper selection of polymeric materials is necessary for making polymeric optical waveguides that display low attenuation and improved environmental stability without an excessive increase in scattering loss. Moreover, a well-defined introduction of light-confining or light-scattering elements is potentially useful to obtain controlled propagation of light in polymeric optical waveguides.

Waveguide structures can be formed by several techniques. For example, ridge waveguides can be formed by coating a lower clad and core layer onto a substrate, patterning the core by etching or development to form a ridge, and over-coating with an upper clad layer. As another example, embedded or channel waveguides can be formed by coating a lower clad and core material over a substrate, defining the waveguide by UV exposure and depositing an upper clad layer over it. Reactant diffusion occurs between the unexposed core and surrounding clad layers into the exposed core area changing its refractive index (hereinafter also referred to as "RI") to form the waveguide.

Optical loss and energy leakage occur if a bending radius of an optical waveguide is too small. Techniques such as widening or tapering the waveguide in the region of the bend, forming offset structures in the region of the bend, and forming irregularly-shaped bends have been proposed to resolve the problem of losses. However, such techniques require complicated optimization and costly design processes and provide relatively limited enhancements.

It would therefore be desirable to have a new waveguide structure to reduce these losses and permit tighter bends.

BRIEF DESCRIPTION OF INVENTION

Briefly, in accordance with one embodiment of the present invention, a method of forming a waveguide comprising a core region, a cladding region, and an index contrast region situated therebetween comprises: depositing a polymerizable composite on a substrate to form a layer, patterning the layer to define an exposed area and an unexposed area of the layer, irradiating the exposed area of the layer, and volatilizing the uncured monomer to form the waveguide, wherein the polymerizable composite comprises a polymer binder and sufficient quantities of an uncured monomer to diffuse into the exposed area of the layer and form the index contrast region.

In accordance with another embodiment of the present invention, a method of forming a waveguide comprising a core region, a cladding region, and an index contrast region situated therebetween comprises: providing a polymerizable composite comprising a polymer binder and an uncured monomer, depositing the polymerizable composite on a substrate to form a layer, patterning the layer to define an exposed area and an unexposed area of the layer, one portion of the unexposed area comprising the core region and another portion of the unexposed area comprising a diffusion source region, irradiating the exposed area of the layer, and volatilizing the uncured monomer to form the waveguide and index contrast region.

In accordance with another embodiment of the present invention, a method of forming a waveguide comprising a cladding region, a core region, and a scattering region situated comprises: providing a polymerizable composite comprising a polymer binder and an uncured monomer, depositing the polymerizable composite on a substrate to form a layer, patterning the layer to define an exposed area and an unexposed area of the layer, one area of the exposed and the unexposed areas comprising the cladding region, and another area of the exposed and the unexposed areas comprising the core region and the scattering region, irradiating the exposed area of the layer, and volatilizing the uncured monomer to form the waveguide.

In accordance with another embodiment of the present invention, a waveguide comprises a polymer layer comprising a core region, a cladding region, and an index contrast region situated therebetween, wherein the index contrast region possesses a lower index of refraction than that of the core and cladding regions.

In accordance with another embodiment of the present invention, a waveguide comprises a polymer layer comprising a core region, a diffusion source region, a cladding region having a lower index of refraction than that of the core and diffusion source regions, and an index contrast region situated between the core region and the diffusion source region and possessing a lower index of refraction than that of the cladding region.

In accordance with another embodiment of the present invention, a waveguide comprises a polymer layer comprising a core region, a scattering region, and a cladding region having a lower index of refraction than that of the core and scattering regions.

BRIEF DESCRIPTION OF DRAWINGS

These and other features, aspects, and advantages of the present invention will become better understood when the following detailed description is read with reference to the accompanying drawings in which like characters represent like parts throughout the drawings, wherein:

FIG. 22 is a top view of a waveguide in accordance with still another embodiment of the present invention.

FIG. 23 is a side view of a gray scale mask fabrication process in accordance with still another embodiment of the present invention.

DETAILED DESCRIPTION

Figure 2:
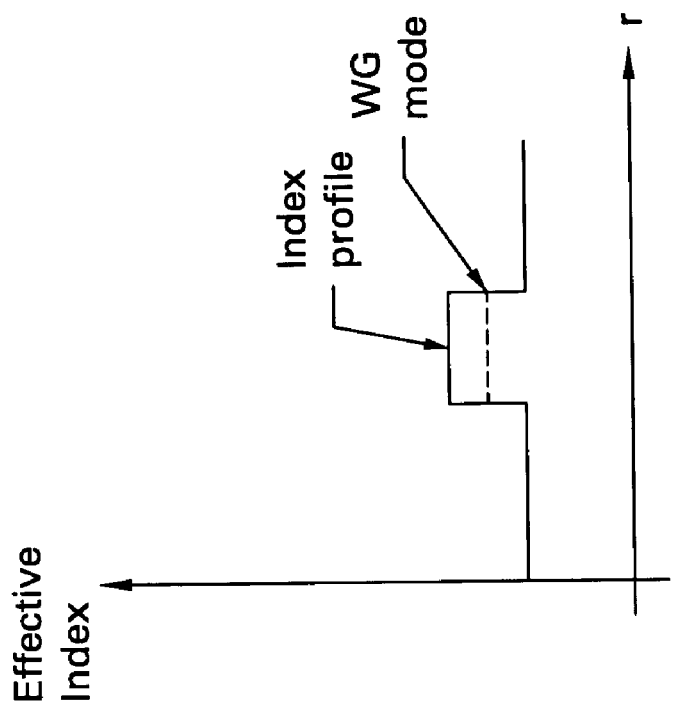
FIG. 2 is a graph illustrating the effective index of the waveguide of FIG. 1.
Figure 1:
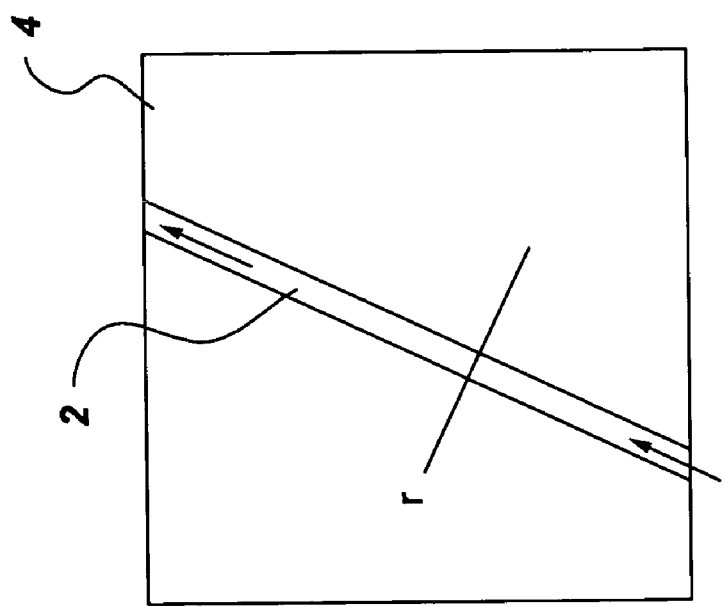
FIG. 1 is a top view of a prior art straight waveguide core and cladding.
Figure 4:
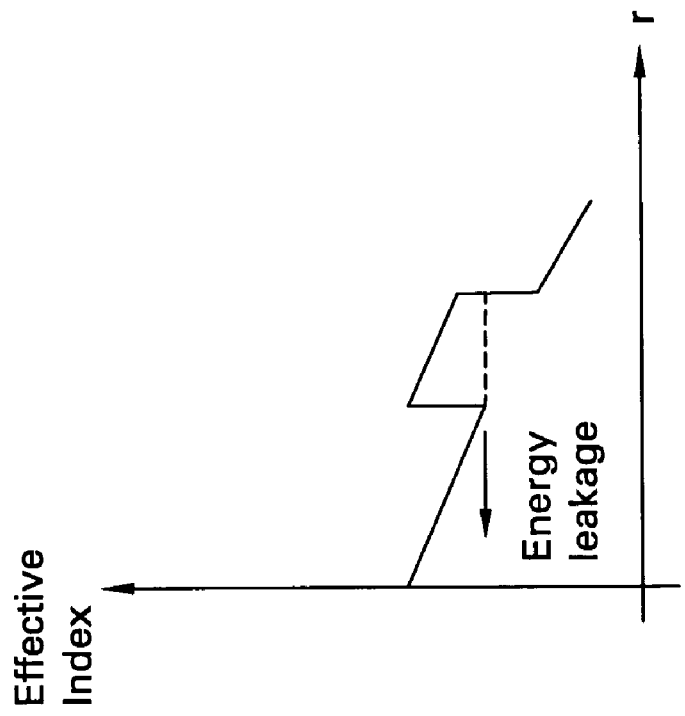
FIG. 4 is a graph illustrating the effective index of the waveguide of FIG. 3.
Figure 3:
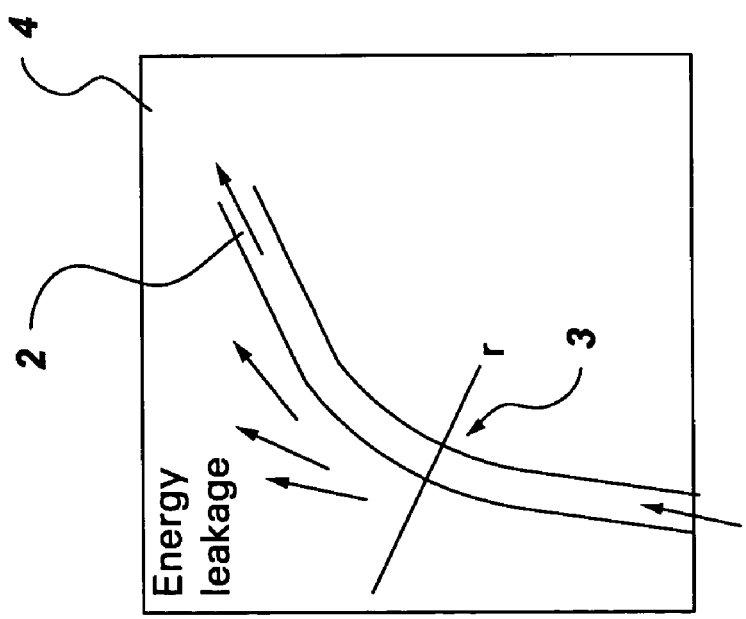
FIG. 3 is a top view of a prior art curved waveguide core and cladding.

FIG. 1 is a top view of a prior art straight waveguide core 2 and cladding 4, and FIG. 2 is a graph illustrating the effective index of the waveguide of FIG. 1. The effective index models a step function. The dashed line shows a stable propagation mode or modes within this particular waveguide and suggests a well wave guiding of this embodiment. In contrast, FIG. 3 is a top view of a prior art curved waveguide core 2 and cladding 4, and FIG. 4 is a graph illustrating the effective index of the waveguide of FIG. 3. The effective index profile of the waveguide is modified (tilted) corresponding to the change of geometric shape of waveguide where, in this case, the waveguide is curved. As a result, the stable guiding mode (as indicated by the dashed line) shown previously in FIG. 2 is no longer supported by the waveguide structure. Instead, it leads to an energy leakage as shown in FIG. 4. This energy leakage occurs when the bending radius of a waveguide exceeds a specific critical value which is related to the effective index profile.

Figure 6:
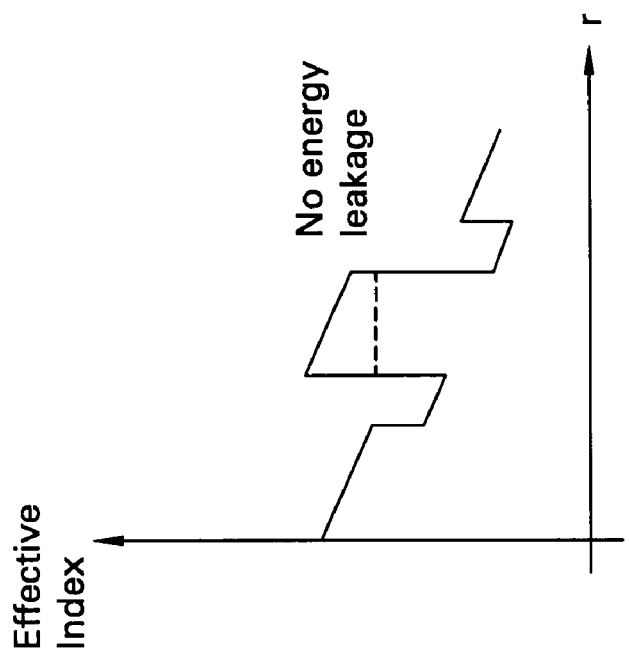
FIG. 6 is a graph illustrating the expected effective index of the waveguide of FIG. 5.
Figure 5:
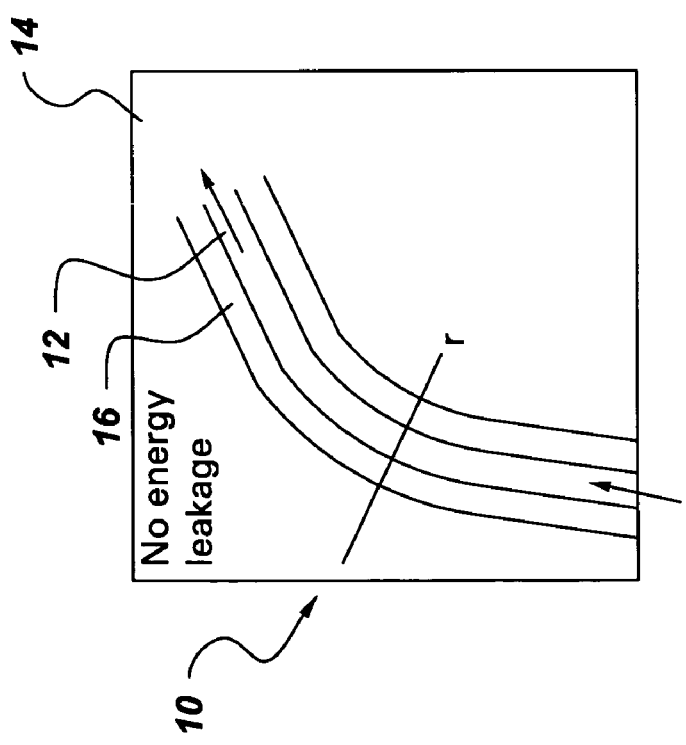
FIG. 5 is a top view of a curved waveguide core and cladding including index contrast regions in accordance with one embodiment of the present invention.

In further contrast, FIG. 5 is a top view of a curved waveguide 10 core 12 and cladding 14 including index contrast regions 16 in accordance with one embodiment of the present invention, and FIG. 6 is a graph illustrating the expected effective index of the waveguide of FIG. 5. By inserting a lower index material (as compared with the cladding material) between waveguide core and cladding, leakage can be reduced or eliminated because optical energy is now better confined because the index contrast along the waveguide core is increased.

To obtain index contrast regions 16, an "enhanced" source of monomer diffusion is provided. FIGS. 5-13 relate to one embodiment wherein the core region may be either exposed or unexposed and the enhanced source of monomer diffusion is accomplished by increasing the monomer concentration in the polymer/monomer blend to a sufficient amount to cause the desired index change. For example, monomer concentrations of forty percent or greater create a useful index change for films having thicknesses on the order of five micrometers whereas concentrations of twenty five percent or greater are typically sufficient for films having thicknesses on the order of about twenty five micrometers. FIGS. 14-19 relate to another embodiment wherein the core region is unexposed and the enhanced source of monomer diffusion is accomplished by providing additional sources of unexposed monomer. If desired, in embodiments wherein the core region is unexposed, the enhanced concentration and additional source embodiments can be used in combination. In embodiments wherein the core region is exposed, the additional sources of unexposed monomer are not available in the manner shown in FIGS. 14-19. These "exposed core" embodiments would be suitable for either single mode or multi-mode designs with diffusion occurring across the whole width of the core and causing a thickness increase throughout the core.

More specifically, in accordance with one embodiment of the present invention, as discussed in more detail below with respect to FIGS. 7-9, a method of forming a waveguide 10 comprising a core region 12, a cladding region 14, and an index contrast region 16 (shown in FIG. 5) situated therebetween comprises: providing a polymerizable composite, depositing the polymerizable composite on a substrate 18 to form a layer 22, patterning the layer to define an exposed area 26 and an unexposed area 28 of the layer, irradiating the exposed area of the layer, and volatilizing the uncured monomer to form the waveguide, wherein the polymerizable composite comprises a polymer binder and sufficient quantities of an uncured monomer to diffuse into the exposed area of the layer and form the index contrast region.

As used herein, a waveguide means at least one waveguide, a core region means at least one core region, a cladding region means at least one cladding region, an index contrast region means at least one index contrast region, on a substrate means either directly touching the substrate or over the substrate but not touching due to an intermediate layer such as a bottom cladding layer 20, and an area may include multiple regions or other portions which may or may not be in physical contact.

Figure 7:
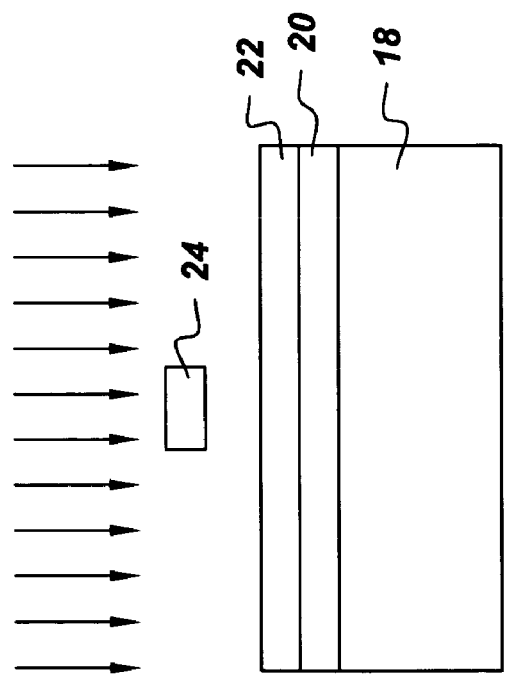
FIG. 7 is a side view illustrating an exposure step in accordance with one embodiment of the present invention.

FIG. 7 is a side view illustrating an exposure step in accordance with one embodiment of the present invention. Substrate 18 may be any structurally suitable material. The substrate material may, for example, comprise a glass, quartz, plastic, a ceramic, a crystalline material, or a semiconductor material, such as, but not limited to, silicon, silicon oxide, gallium arsenide, and silicon nitride, or combinations thereof. In one embodiment, bottom cladding layer 20 is situated on substrate 18 and underlies polymerizable composite 22. As is described in commonly assigned U.S. patent application Ser. Nos. 10/306,439 and 10/306,440, which are herein incorporated by reference, irradiating can be accomplished via irradiating with ultraviolet radiation, and patterning can be accomplished via use of a mask 24 such as a gray scale mask for example. Other alternative forms of irradiation such as a direct-write laser can also be used. For purposes of example, an embodiment wherein the core is unexposed is shown. In an alternative embodiment, the core is exposed.

Composite RI (hereinafter designated as "$RI_{composite}$") depends on the quantity of the individual polymer components making up the composite polymer and their respective refractive indices, as shown in Equation (1):

$$RI_{composite} = \Sigma(W_n \times RI_n) \qquad (Eq. 1)$$

where "$W_n$" represents the weight percent of the $n^{th}$ polymer component in the composite polymer, and "$RI_n$" represents the RI of the $n^{th}$ polymer component in the composite polymer. When the RI of the monomer (hereinafter designated as "$RI_{monomer}$") is greater than the RI of the polymer binder (hereinafter designated as "$RI_{polymer}$"), following irradiation of the polymerizable composite using different tones of gray scale mask, the RI of the polymerizable composite increases with increasing thickness of the polymerizable composite. On the other hand, when $RI_{monomer}$ is lower than $RI_{polymer}$, the RI of the polymerizable composite decreases with increasing thickness of the polymerizable composite. When $RI_{monomer}$ is approximately equal to $RI_{polymer}$, the RI of the polymerizable composite remains relatively unchanged with thickness. Thus, the preparation and composition of the polymerizable composite can be tailored to meet the RI requirements of a particular optical device.

Figure 8:
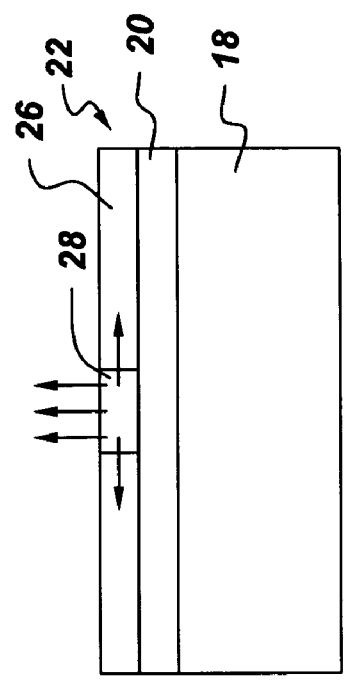
FIG. 8 is a side view illustrating a diffusion step in accordance with the embodiment of FIG. 7.
Figure 11:
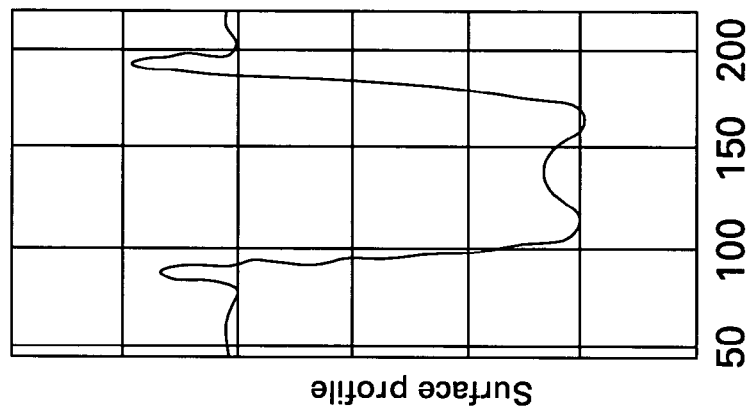
FIG. 11 is a graph illustrating the height profile of the waveguide of FIG. 9.
Figure 9:
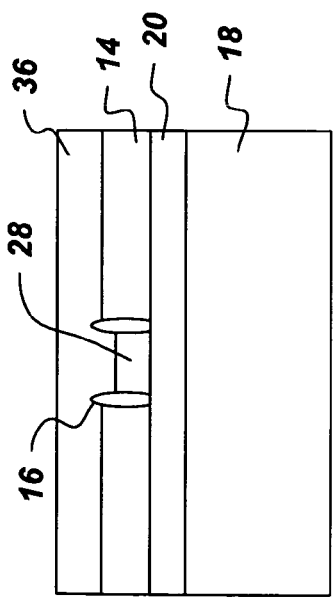
FIG. 9 is a side view illustrative of the waveguide, cladding, and index contrast regions after the diffusion step of the embodiment of FIG. 8.
Figure 10:
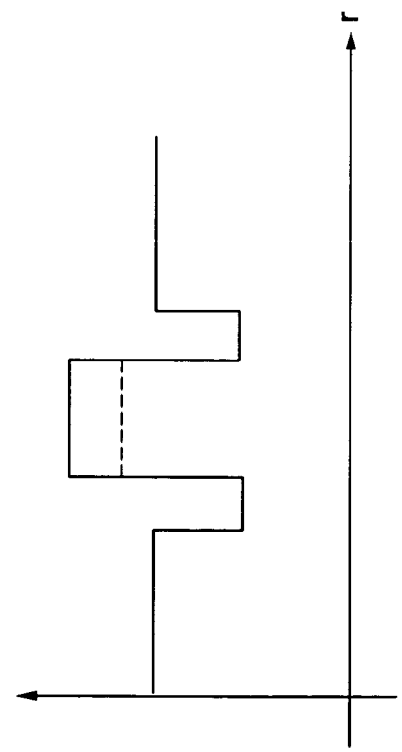
FIG. 10 is a graph illustrating the effective index of the waveguide of FIG. 9.

FIG. 8 is a side view illustrating baking and diffusion (hereinafter also referred to as "volatilizing") of uncured monomer from an area of the layer that is not exposed to irradiation (shown as unexposed area 28), and FIGS. 9-11 are view illustrative of the waveguide, cladding, and index contrast regions after the diffusion step of the embodiment of FIG. 8 (and addition of a top cladding layer 30) along with corresponding index and height profiles. Top and bottom cladding layers typically comprise materials such as optical polymer, sol gel (a colloidal suspension of silica particles that is gelled to form a solid), low-temperature grown inorganic crystals, or semiconductors, for example.

During diffusion, uncured monomers from unexposed area 28 diffuse both vertically (and are evaporated) and laterally into exposed area 26 (the catalysts activated area) where the monomers are polymerized, enhancing the amount of low RI composition in the cladding beyond what was initially added into the composite blend. By appropriate selection of the chemical composition of monomer/polymer blend (percent and ratio), the structure and geometry of waveguide (thickness, width, spacing), and the conditions used during processing (post bake, atmosphere or vacuum), enhancement of low index monomer content into the side cladding, and thus enhancement of the index contrast, can exceed about twenty percent.

As can be seen in FIG. 10, after curing the expected index profile is highest in the region of core 12 and lowest in the index contrast regions 16. Furthermore, in as the experimental measurement seen in FIG. 11, the surface topology crossing the waveguides reflects the profile of the true chemical composition. In this case, the higher the profile, the lower the RI. In other words, the result shown in FIG. 11 indicates that a structure illustrated in FIG. 10 has been experimentally realized.

The polymer binder comprises any polymer that is thermally stable during the monomer evaporation step and that is compatible with the monomer chosen. Some examples of useful polymer binders are described in aforementioned U.S. patent application Ser. Nos. 10/306,439 and 10/306,440. For example, the polymer binder typically comprises at least one of an acrylate polymer, a polyimide, a polycarbonate, a polysulfone, a polyether ketone, and combinations thereof. In a more specific embodiment, the polymer binder comprises an acrylate polymer which is at least one of a poly(methyl methacrylate), poly(tetrafluoropropyl methacrylate), poly(2,2,2-triflouroethyl methacrylate), copolymers comprising structural units derived from an acrylate polymer, and combinations thereof.

The uncured monomer comprises any monomer that is compatible with the polymer binder, can be polymerized by exposure to radiation, and will evaporate in the monomer form during the bake step. The monomer can be mono-functional (forming a thermoplastic polymer during irradiation) or poly-functional (forming a thermosetting polymer matrix during irradiation). Some examples of useful uncured monomer materials are also described in aforementioned U.S. patent application Ser. Nos. 10/306,439 and 10/306,440. In one embodiment, the uncured monomer comprises at least one of an acrylic monomer, a cyanate monomer, a vinyl monomer, an epoxide-containing monomer, and combinations thereof. In a more specific embodiment, the uncured monomer comprises at least one of benzyl methacrylate, 2,2,2-trifluoroethyl methacrylate, tetrafluoropropyl methacrylate, methyl methacrylate, 3-4-epoxycyclohexylmethyl-3,4-epoxycyclohexane carboxylate, bisphenol A diglycidyl ether, bisphenol F diglycidyl ether, styrene, allyl diglycol carbonate, and cyanate ester.

As described in detail in aforementioned U.S. patent application Ser. Nos. 10/306,439 and 10/306,440, in addition to the at least one polymer binder and one uncured monomer, the polymerizable composite material may further include at least one of a photo-catalyst or a photo-initiator, a co-catalyst, an anti-oxidant, additives such as, but not limited to, chain transfer agents, photo-stabilizers, volume expanders, free radical scavengers, contrast enhancers, nitrones, and UV absorbers, and a solvent, the latter being present to facilitate spin coating the polymerizable composite material onto a substrate. In one embodiment, the monomer preferably comprises from about 5% to about 70% of the polymerizable composite. x Non-limiting examples of photo-initiators that can be used for polymerizing a radiation-polymerizable monomer, such as an epoxy, include triarylsulfonium hexafluoroantimonate salt and triarylsulfonium hexafluorophosphate salt (also referred to hereinafter as "Cyracure") photo-initiators, or, for an acrylate monomer, 1-hydroxy-cyclohexyl-phenyl-ketone, 2,2-dimethoxy-1,2-diphenylethan-1-one or 2-methyl-1[4-(methylthio)phenyl]-2-morpholinopropan-1-one (also referred to hereinafter as "Irgacure") photo-initiators. In such embodiments, the photo-initiator present in each polymerizable composite is present in an amount sufficient to polymerize the uncured monomer upon exposure to radiation.

As described in aforementioned U.S. patent application Ser. Nos. 10/306,439 and 10/306,440, when the radiation curable compounds described above are cured by ultraviolet radiation, it is possible to shorten the curing time by adding a photo-sensitizer, such as, but not limited to, benzoin, benzoin methyl ether, benzoin ethyl ether, benzoin isopropyl ether, benzil (dibenzoyl), diphenyl disulfide, tetramethyl thiuram monosulfide, diacetyl, azobisisobutyronitrile, 2-methyl-anthraquinone, 2-ethyl-anthraquinone or 2-tert-butylanthraquinone, to the monomer, oligomer, or polymer component or its solution.

EXAMPLE 1

Into a suitable clean glass container, 60 grams of low color grade polysulfone polymer (Udel P-3703, available from Solvay Advanced Polymers, Alpharetta, Ga.) was added along with 200 grams of anhydrous anisole. The blend was warmed to about 50° C. and mixed for about 24 hours to dissolve the polymer. To this mixture was added 40 grams of CY179 cycloaliphatic epoxy resin (available from Vantico Inc, Brewster N.Y.), 0.8 gram of Cyracure UVI-6976 UV catalyst (available from Dow Chemical Co. Midland, Mich.), and 0.4 gram of Irganox 1010 antioxidant (available from Ciba Specialty Chemicals, Tarrytown, N.Y.). The mixture was blended to completely intermix all components and filtered prior to use through a nominal 0.5-micron membrane filter to give the polymerizable composite. A 6-micron thick film of the polymerizable composite was prepared on a glass substrate by spin coating the material at 3000 revolutions per minute (rpm) for 30 seconds and heating on a hotplate 4 minutes at 80° C. to remove the solvent. A patterned chrome image on a quartz plate was used to expose and define a pattern on the film wherein the core region was not exposed. A 10 second exposure using a Karl Suss contact printer was used. After exposure, the sample was baked on a hotplate for 10 minutes at 80° C., ramped up to 175° C. over 1 hour, and held at 175° C. for 30 minutes. Surface profilometry measurements of the resulting surface topography indicated approximately a 2.2-micron step between the lower un-exposed film surface (4 microns thick) and the upper exposed film surface (6.2 microns thick). Weight loss measurements on other test samples receiving either blanket UV exposure or no exposure, followed by the bake step indicated about 99% epoxy loss from unexposed areas, whereas exposed areas lost less than 5% epoxy. RI for the exposed areas was about 2% lower than that measured in the unexposed areas.

EXAMPLE 2

Into a glass container, capable of being sealed under vacuum, was distilled 19 grams of tetrafluoropropyl methacrylate, followed by addition of 56 grams of methyl methacrylate, 93 grams of cyclohexanone, 0.15 gram of N-dodecanethiol, and 0.19 gram of benzoyl peroxide. The mixture was degassed and sealed under vacuum. After being heated with mixing at about 75° C. for about 24 hours, followed by further heating at about 80° C. for about 24 hours, the resulting mixture was cooled and treated with 55.5 grams of anisole. The resulting blend was a viscous, clear, and colorless acrylate copolymer consisting of about 75% poly(methyl methacrylate) and 25% poly(tetrafluoropropyl methacrylate), present as 33.5% solids in the cyclohexanone-anisole mixed solvent. An additional 10.7 grams of anisole, 8 grams of CY179 epoxy monomer, 0.15 gram of Irganox 1010, and 0.13 gram of Cyracure UVI-6976 were added to a 35-gram portion of the blend. The resulting polymerizable composite contained about 70% by weight of the acrylate polymer and 30% by weight of the epoxy monomer. A 6-micron thick film of the polymerizable composite was prepared on a glass substrate by using the procedure described in Example 1 except with the difference being that the core was exposed. After patterning, irradiating and baking the film as described in Example 1, surface profilometry measurement of the topography of the resulting film of the composite polymeric material indicated a 6.6 micron film thickness in the UV-exposed areas, and a 4 micron film thickness in the unexposed areas. RI for the exposed areas was about 1.5% higher than that measured in the un-exposed areas.

The results from Example 1 and Example 2 indicate that after the bake step, the composition of the UV-exposed and the unexposed areas differ significantly from each other. For Example 1, in the UV-exposed areas, the composite polymeric material showed a composition corresponding to approximately 60 percent by weight of polysulfone and 40 percent by weight of the epoxy polymer linkages derived from CY 179, similar to the starting composite material. After baking, however, the composite polymeric material in the unexposed areas showed a composition corresponding to approximately 95 percent by weight of polysulfone and 5 percent by weight of the epoxy polymer linkages derived from CY 179.

Figure 12:
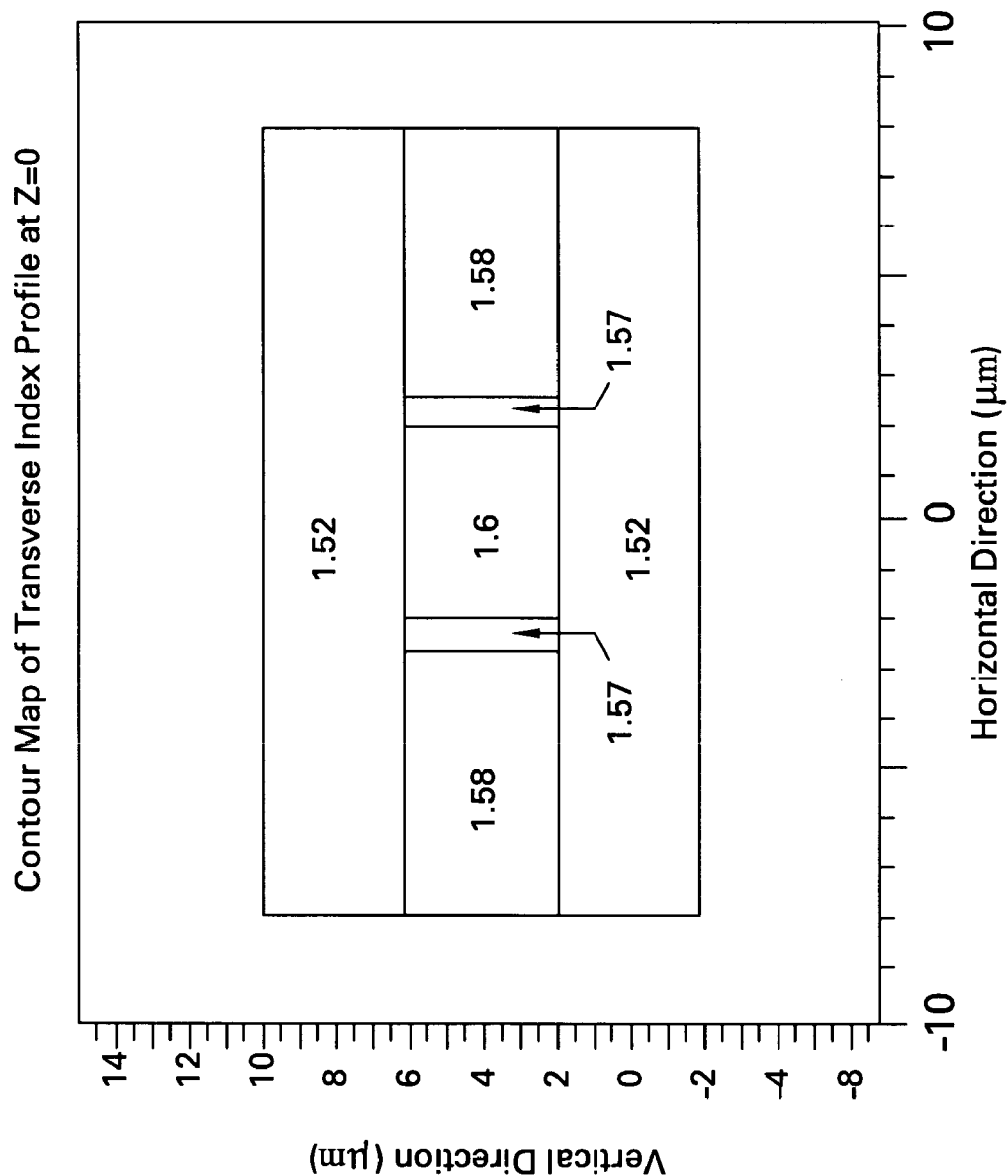
FIG. 12 is a contour map of expected index profile of the embodiment of FIG. 9.

FIG. 12 is a contour map of expected index profile of the embodiment of FIG. 9. In the model of FIG. 12, waveguides six microns wide are photodefined using polysulfone/CY179 blend with CY179 epoxy used for top and bottom clad layers as described above with respect to Experiment 1. As can be seen, it is expected that cladding region 14 has an RI of 1.58, core region 12 has an RI of 1.6, and index contrast region 16 has an RI of 1.57.

Figure 13:
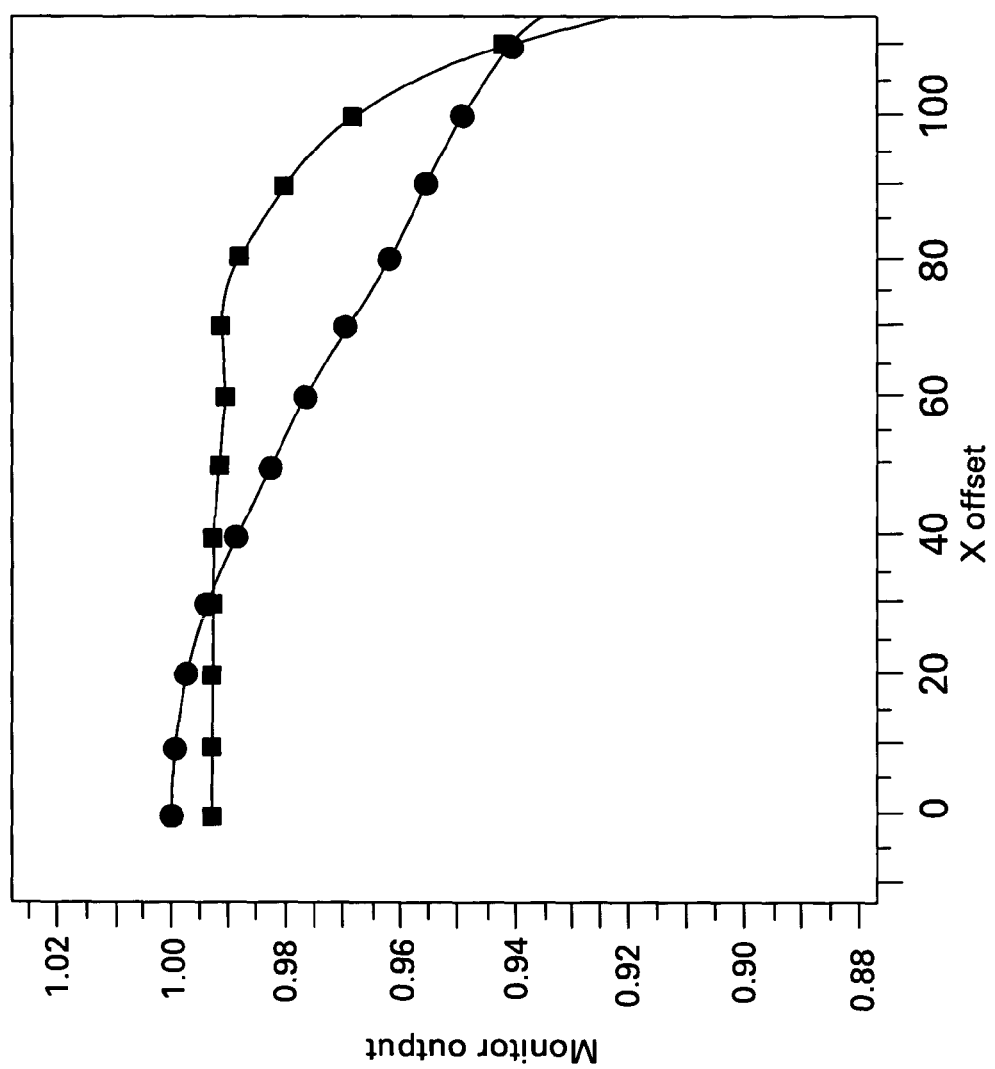
FIG. 13 is a graph illustrating expected optical output for a conventional curved waveguide in comparison with expected optical output for a waveguide embodiment of the present invention.

FIG. 13 is a graph illustrating expected optical output for a conventional S-bend curved waveguide (with a bend radius of 2.5 millimeter for x offset of 100 micrometers) in comparison with expected optical output for a waveguide embodiment of the present invention. The simulation result shown in FIG. 13 indicates an expected improvement in bending radius by at least a factor of three. Waveguides fabricated by the processes of the present invention are expected to provide a better energy confinement. Further, the present invention can be used to reduce cross talk between waveguides, and thus the density of optical waveguide (number of waveguides per unit area) can be increased and result in a smaller and more compact footprint of an optical integrated circuit.

Figure 14:
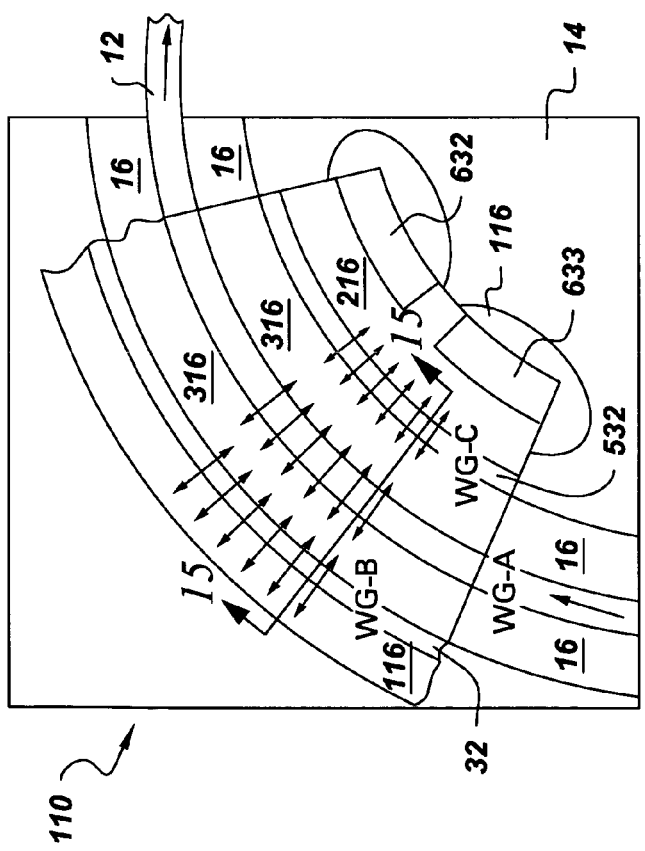
FIG. 14 is a top view of a curved waveguide core and cladding including index contrast regions in accordance with another embodiment of the present invention.

FIG. 14 is a top view of a curved waveguide 10 core 12 and cladding 14 including index contrast regions in accordance with another embodiment of the present invention. The embodiment of FIG. 14 is designed for enhancing the amount of monomer diffusion into selected catalyst activated (exposed) areas by providing additional monomer diffusion source regions near one or both sides of a bend radius. In the embodiment of FIG. 14 one source of monomer diffusion is from core 12 itself and a second source of monomer diffusion 32 is from an unexposed region adjacent to the side cladding surrounding the core. Both sources can be fabricated simultaneously by a masking process, for example.

More specifically, one embodiment is a method of forming a waveguide 10 comprising a core region 12, a cladding region 14, and an index contrast region 316 situated therebetween (meaning at least partially—not necessarily along the entire waveguide). The method comprises: providing a polymerizable composite comprising a polymer binder and an uncured monomer, depositing the polymerizable composite on a substrate 18 to form a layer 22, patterning the layer to define an exposed area 26 and an unexposed area 28 of the layer (FIG. 8), one portion of the unexposed area comprising the core region and another portion of the unexposed area comprising a diffusion source region 32, irradiating the exposed area of the layer, and volatilizing the uncured monomer to form the waveguide and index contrast region. As used herein, a diffusion source region means at least one diffusion source region. Typically, as shown in the embodiment of FIG. 14, patterning comprises defining diffusion source region 32 adjacent to index contrast region 316.

Figure 16:
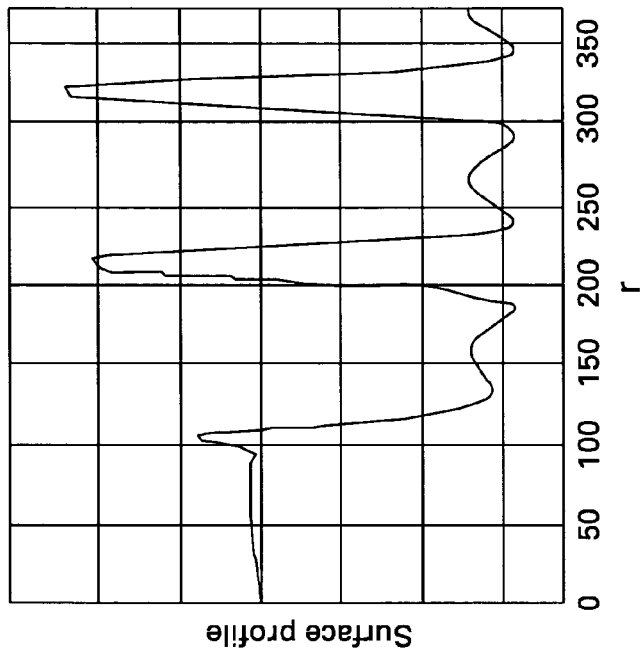
FIG. 16 is a graph illustrating the height profile of the waveguide of FIG. 14.
Figure 15:
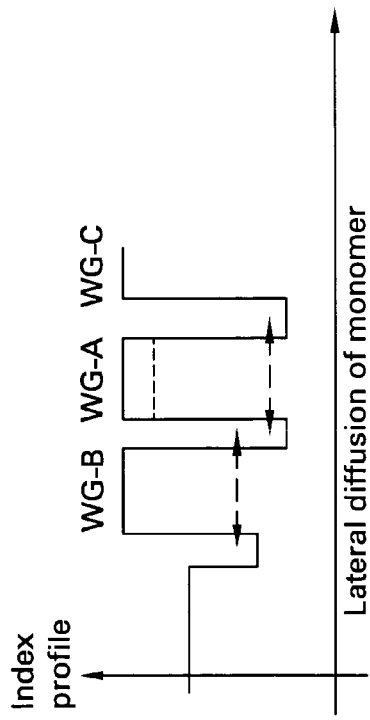
FIG. 15 is a graph illustrating the effective index of the waveguide of FIG. 14.

FIG. 15 is a graph illustrating the effective index of the waveguide 12 of FIG. 14, and FIG. 16 is a graph of experimental result illustrating the height profile of the waveguide of FIG. 14. These figures represent the expected effects of diffusion source regions 32 and 532 but do not represent any expected effects of diffusion source regions 632 and 633. As can be seen in FIG. 15, it is expected that regions 316 between waveguide 12 and diffusion source regions 32 and 532 will have the lowest indices of refraction because monomers are diffused into them from two sides rather than from one side alone. As can also be seen in FIG. 16, it is expected that the regions between waveguide 12 and diffusion source regions 32 and 532 will have the highest thickness.

In one embodiment, the diffusion source region comprises two diffusion source regions. As used herein two diffusion source regions means at least two diffusion source regions. The diffusion source regions may be situated on one side of the core region (as shown by regions 532, 632, 633) and/or may be situated on opposing sides of the core region (as shown by regions 32 and 632, for example). Further, multiple diffusion source regions be situated adjacent to the index contrast region (as shown by regions 32 and 532). In addition, or as an alternative, in one embodiment at least one of the multiple diffusion source regions 532 is situated between core region 12 and at least one other 633 of the multiple diffusion source regions (with an additional index contrast region 216 situated therebetween). Although diffusion source regions 32 and 532 are shown as being somewhat symmetric with respect to the curve, the orientation is not critical. In any of these embodiments, spacing between these diffusion source regions can be periodic, sinusoid-periodic or semi-periodic for specific functionalities and applications.

In another related embodiment, the diffusion source regions comprise at least one device selected from the group consisting of Omni reflectors, Bragg gratings, directional couplers, and combinations thereof. Such structures can be used to further enhance optical waveguides. For example, quasi-omni reflectors typically require high index cores and low index claddings which are more easily obtainable using the present invention—particularly in embodiments wherein diffusion source regions are stacked in parallel on both sides of the core region (as shown by regions 532 and 632, for example). Embodiments of the present invention can also be used in Brag reflectors which pass light of a narrower range and do not have the high index contrast which is required of quasi-omni reflectors. Directional coupling relates to channeling to nearby waveguides. For example, in the embodiment of FIG. 14, light can pass between the adjacent waveguide core type regions formed by the unexposed area. If an adjacent waveguide core type region 32 is merely a source of diffusion, the length of the adjacent waveguide core type region can be selected so that the last bounce sends the light back to the primary waveguide core 12. Alternatively the adjacent waveguide core type region can transmit the light to another device such as a photodetector (not shown), for example.

Figure 17:
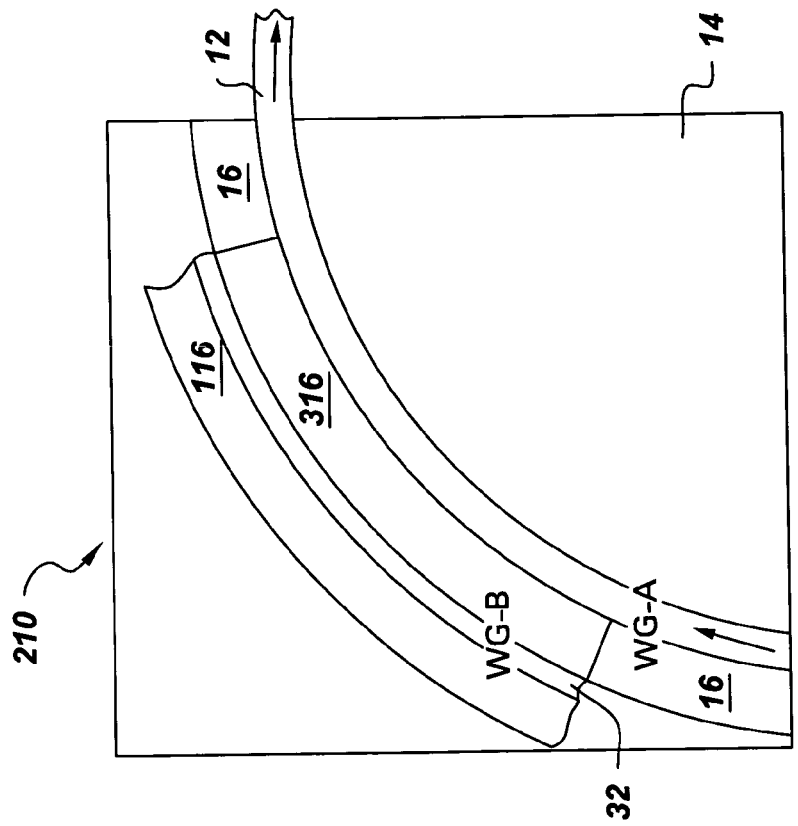
FIG. 17 is a top view of a curved waveguide core and cladding including index contrast regions in accordance with another embodiment of the present invention.
Figure 18:
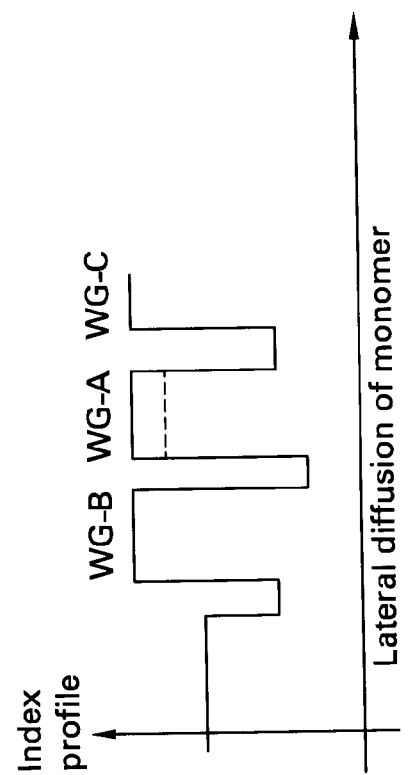
FIG. 18 is a graph illustrating the effective index of the waveguide of FIG. 17.

As stated above, diffusion source regions may be asymmetrical or situated on one side. FIG. 17 is a top view of a curved waveguide 210 core 12 and cladding 14 including index contrast regions 16, 116, and 16 with a diffusion source region 32 in accordance with another embodiment of the present invention, and FIG. 18 is a graph illustrating the effective index of the waveguide of FIG. 17.

Figure 19:
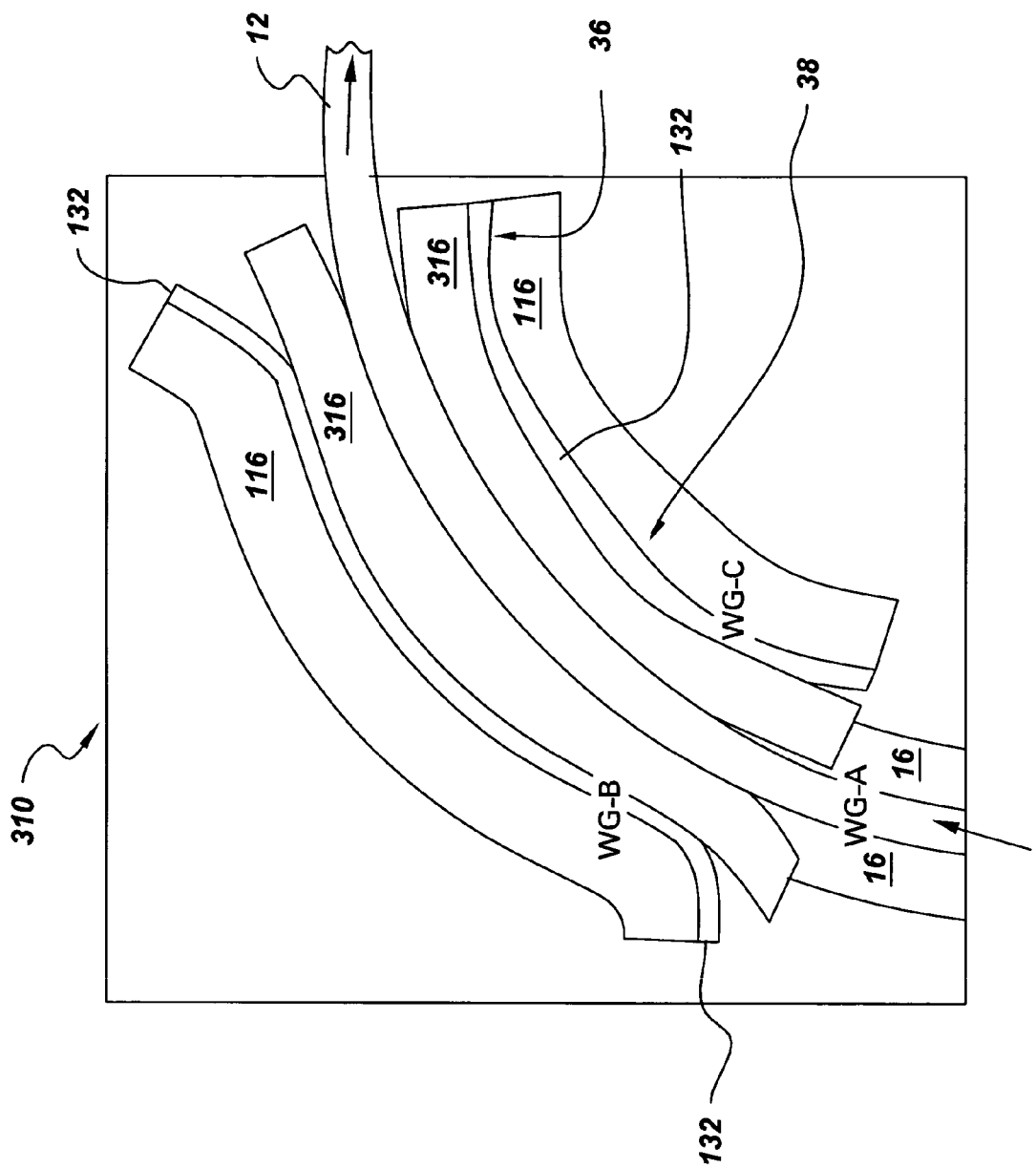
FIG. 19 is a top view of a curved waveguide core and cladding including index contrast regions in accordance with another embodiment of the present invention.

FIG. 19 is a top view of a curved waveguide 310 core and cladding including index contrast regions in accordance with another embodiment of the present invention wherein at least one end portion 36 of diffusion source region 132 is situated further from the core region than a center portion 38 of diffusion source region 132. More specifically, the embodiment of FIG. 19 illustrates diffusion source regions patterned in a "fan out" design. As a result, optical signals propagating within the waveguide experience a gradual change and modulation of the effective index of waveguide. The diffusion source region can be patterned to form an adiabatic mode-converter with the gradually increased waveguide confinement. In this case, better waveguide confinement, even lower power leakage, and less modal or chromatic dispersion characteristics of this waveguide can be realized.

Figure 20:
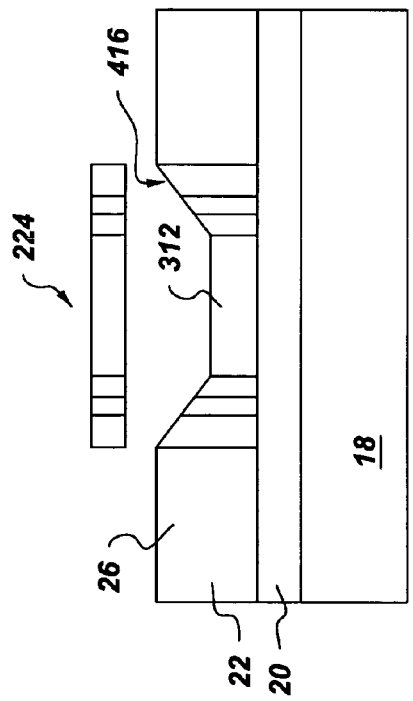
FIG. 20 is a side view of a gray scale mask fabrication process in accordance with another embodiment of the present invention.

FIG. 20 is a side view of a gray scale mask 224 fabrication process in accordance with another embodiment of the present invention. The mask used for defining the area 26 to be exposed to the radiation source can have various shapes, sizes, and different degrees of grayscale. Different grayscales will produce core regions 312 and index contrast regions 416 of different compositions. The use of a grayscale mask may thus be used to produce different topographies or array of topographies in a single exposure of a single layer of a polymerizable composite.

Figure 21:
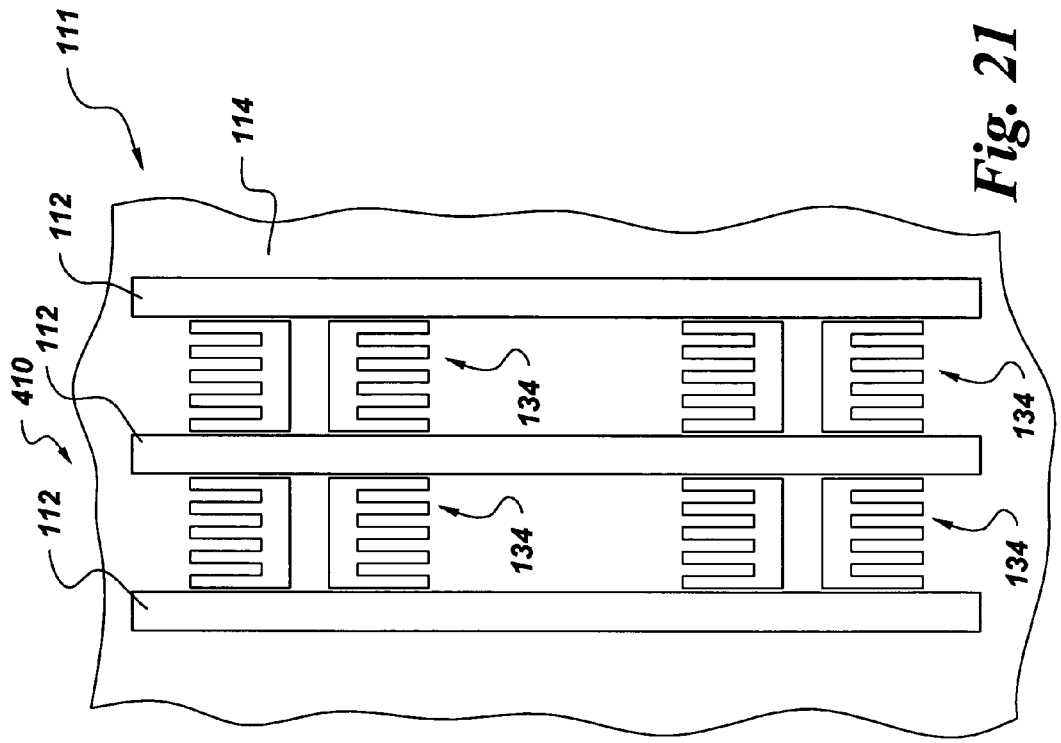
FIG. 21 is a top view of a waveguide in accordance with another embodiment of the present invention.

FIG. 21 is a top view of a waveguide 410 in accordance with another embodiment of the present invention which is a method of forming a waveguide 410 array 111 comprising a cladding region 114, core regions 112, and a scattering region 134 situated between the core regions (meaning at least partially—not necessarily along the entire lengths). The method of this embodiment comprises: providing a polymerizable composite comprising a polymer binder and an uncured monomer, depositing the polymerizable composite on a substrate 18 to form a layer 22, patterning the layer to define an exposed area 26 and an unexposed area 28 of the layer, one area of the exposed and the unexposed areas comprising the cladding region and another area of the exposed and the unexposed areas comprising the core regions and the scattering region, irradiating the exposed area of the layer, and volatilizing the uncured monomer to form the waveguide array. As used herein, two core regions means at least two core regions and a scattering region means at least one scattering region.

The scattering regions are useful to prevent cross talk between waveguides. More specifically, the scattering regions can be used minimize light transmission through cladding areas immediately adjacent to the waveguides which, if not blocked, can add signal noise and induce cross talk. These scattering regions are fabricated at the same time as the waveguide and integral to the formation of the core regions such that no additional processing steps are required. Although the index contrast regions 16 (shown in FIG. 5) are not required in the embodiment of FIG. 21, such optional regions are useful to further minimize leakage.

In one embodiment, the scattering regions comprise any arbitrary polygon design sufficient to provide enough RI contrast to interfere with efficient light transmission through the clad areas. A comb pattern is one useful shape. The goal when selecting a shape or pattern is that any light propagating through the cladding be scattered/absorbed when the light hits the scattering region which appears to the light as an area with rapidly changing RIs. Light traveling through the core is stabilized by the RI gradient which does not change down its center, whereas in the cladding, both the lack of proper RI gradient and the scattering regions interfere with transmission. Such structures, if placed in the light path of a waveguide core or adjacent cladding region, will interfere with the transmission of the light. Incorporation of the scattering regions will allow less precise alignment of connectors, fibers, and laser diodes to the waveguide cores, as light entering a clad area will be quickly blocked. The light blockage feature is useful even in single waveguide embodiments, particularly if scattering regions (meaning herein at least two scattering regions) are situated on opposite sides of a core region.

Figure 24:
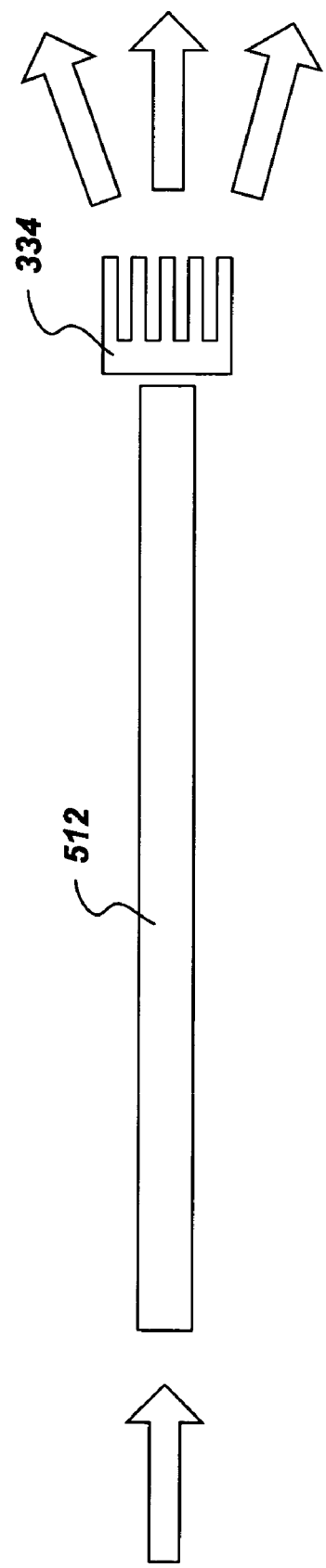
FIG. 24 is a top view of a waveguide in accordance with still another embodiment of the present invention.

Also, such light blockage structures can be patterned and positioned for use as optical terminators as shown by core 512 and scattering region 334 in FIG. 24, for example. In such embodiments, patterning to define exposed and un-exposed areas comprises defining a scattering region adapted for optical termination. An optical terminator is useful when optical signal or power needs to be dispersed into cladding or free space at the end of null waveguide or waveguide structures. It is also particularly useful to reduce the back-reflection of waveguide ends.

FIG. 22 is a top view of waveguide array 211 in accordance with still another embodiment of the present invention, and FIG. 23 is a side view of a gray scale mask fabrication process. In this embodiment, the mask results in the cladding region 214 being unexposed areas and the core regions 212, 412 and scattering regions 234 being exposed. For this reason, the core has a higher thickness than the cladding. Although the index contrast regions 516 are not required in the embodiment of FIG. 22, selecting the polymerizable composite so that such regions occur is useful to further minimize leakage.

Embodiments of the present invention have been described primarily in the context of methods for ease of description. Unique structures are produced by the methods which may include materials and features from the above embodiments in various combinations.

For example, in one embodiment a waveguide comprises a polymer layer comprising a core region 12, a cladding region 14, and an index contrast region 16 situated therebetween, wherein the index contrast region has a lower index of refraction than that of the core and cladding regions. Example materials include those described above with respect to the method embodiments. In one embodiment, the core region comprises at least one curve.

In another embodiment, a waveguide 10 comprises a polymer layer 22 comprising a core region 12, a diffusion source region 32, a cladding region 14 having a lower index of refraction than that of the core and diffusion source regions, an index contrast region 316 situated between the core region and the diffusion source region and having a lower index of refraction than that of the cladding region. Example materials and diffusion source locations and arrangement include those described above with respect to the method embodiments.

In another embodiment, a waveguide 410 comprises a polymer layer comprising a core region 114, a scattering region 134, and a cladding region 114 having a lower index of refraction than that of the core and scattering regions. In another related embodiment, a waveguide array 111 comprises a polymer layer comprising two core regions 114, a scattering region 134 situated between the core regions, and a cladding region 114 having a lower index of refraction than that of the core and scattering regions. In another related embodiment, a waveguide comprises a polymer layer comprising a core region 114, scattering regions 134 situated on opposite sides of the core region, and a cladding region 114 having a lower index of refraction than that of the core and scatter. In a more specific aspect of either of these related embodiments, the layer further comprises an index contrast region situated between the core region and the cladding region and having a lower index of refraction than that of the cladding region. Example materials, patterns, and shapes include those described above with respect to the method embodiments.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A method of forming a waveguide comprising a core region, a cladding region, and an index contrast region situated therebetween, the method comprising:
   depositing a polymerizable composite on a substrate to form a layer, wherein the polymerizable composite comprises a polymer binder and an uncured monomer,
   patterning the layer to define an exposed area and an unexposed area of the layer in a manner such that the unexposed area includes the core region,
   irradiating the exposed area of the layer to polymerize the polymerizable composite in the exposed area, and
   volatilizing the uncured monomer in the unexposed area by baking and by diffusing some uncured monomer from the unexposed area towards the exposed area to form the index contrast region of the waveguide.

2. The method of claim 1, wherein the polymer binder comprises at least one of an acrylate polymer, a polyester, a polyimide, a polycarbonate, a polysulfone, a polyether ketone, and combinations thereof.

3. The method of claim 1, wherein the polymer binder comprises an acrylate polymer comprising at least one of a poly(methyl methacrylate), poly(tetrafluoropropyl methacrylate), poly(2,2,2-triflouroethyl methacrylate), copolymers comprising structural units derived from an acrylate polymer, and combinations thereof.

4. The method of claim 1, wherein the uncured monomer comprises at least one of an acrylic monomer, a cyanate monomer, a vinyl monomer, an epoxide-containing monomer, and combinations thereof.

5. The method of claim 1, wherein the uncured monomer comprises at least one of benzyl methacrylate, 2,2,2-trifluoroethyl methacrylate, tetrafluoropropyl methacrylate, methyl methacrylate, 3-4-epoxycyclohexylmethyl-3,4-epoxycyclohexane carboxylate, bisphenol A diglycidyl ether, bisphenol F diglycidyl ether, styrene, allyl diglycol carbonate, and cyanate ester.

6. The method of claim 1, wherein irradiating the exposed area of the layer comprises irradiating the exposed area with ultraviolet radiation.

7. The method of claim 1, wherein patterning the layer comprises patterning the layer using a gray scale mask.

8. The method of claim 1 wherein patterning comprises patterning the layer to define at least one curve.

9. The method of claim 1 wherein the polymerizable composite comprises a polysulfone/epoxy blend.

10. The method of claim 1 wherein patterning is performed in a manner such that the unexposed area further includes a diffusion source region.

11. The method of claim 10 wherein the polymerizable composite comprises an acrylic/epoxy blend.

12. The method of claim 11 wherein polymerizable composite includes a concentration of at least about 25% uncured monomer.

13. The method of claim 11 wherein polymerizable composite includes a concentration of at least about 40% uncured monomer.

14. A method of forming a waveguide comprising a core region, a cladding region, and an index contrast region situated therebetween, the method comprising:
  providing a polymerizable composite comprising a polymer binder and an uncured monomer,
  depositing the polymerizable composite on a substrate to form a layer,
  patterning the layer to define an exposed area and an unexposed area of the layer, one portion of the unexposed area comprising the core region and another portion of the unexposed area comprising a diffusion source region,
  irradiating the exposed area of the layer to polymerize the polymerizable composite in the exposed area, and
  volatilizing the uncured monomer in the core and diffusion source regions to diffuse some uncured monomer from the unexposed area towards the exposed area and form the index contrast region of the waveguide.

15. The method of claim 14, wherein the polymer binder comprises at least one of an acrylate polymer, a polyester, a polyimide, a polycarbonate, a polysulfone, a polyether ketone, and combinations thereof.

16. The method of claim 14, wherein the polymer binder comprises an acrylate polymer comprising at least one of a poly(methyl methacrylate), poly(tetrafluoropropyl methacrylate), poly(2,2,2-triflouroethyl methacrylate), copolymers comprising structural units derived from an acrylate polymer, and combinations thereof.

17. The method of claim 14, wherein the uncured monomer comprises at least one of an acrylic monomer, a cyanate monomer, a vinyl monomer, an epoxide-containing monomer, and combinations thereof.

18. The method of claim 14, wherein the uncured monomer comprises at least one of benzyl methacrylate, 2,2,2-trifluoroethyl methacrylate, tetrafluoropropyl methacrylate, methyl methacrylate, 3-4-epoxycyclohexylmethyl-3,4-epoxycyclohexane carboxylate, bisphenol A diglycidyl ether, bisphenol F diglycidyl ether, styrene, allyl diglycol carbonate, and cyanate ester.

19. The method of claim 14, wherein irradiating the exposed area of the layer comprises irradiating the exposed area with ultraviolet radiation.

20. The method of claim 14, wherein patterning the layer comprises patterning the layer using a gray scale mask.

21. The method of claim 14, wherein patterning comprises defining the diffusion source region adjacent to the index contrast region.

22. The method of claim 21 wherein at least one end portion of the diffusion source region is situated further from the core region than a center portion of the diffusion source region.

23. The method of claim 22 wherein the diffusion source region is patterned to form an adiabatic mode-converter.

24. The method of claim 14, wherein the diffusion source region comprises at least two diffusion source regions.

25. The method of claim 24, wherein the at least two diffusion source regions include diffusion source regions situated on opposing sides of the core region.

26. The method of claim 25, wherein the at least two diffusion source regions further include multiple diffusion source regions situated on one side of the core region.

27. The method of claim 24, wherein the at least two diffusion source regions include multiple diffusion source regions situated on one side of the core region.

28. The method of claim 27, wherein the multiple diffusion source regions are each adjacent to the index contrast region.

29. The method of claim 27, wherein at least one of the multiple diffusion source regions is situated between the core region and at least one other of the multiple diffusion source regions.

30. The method of claim 24, wherein the at least two diffusion source regions comprise at least one device selected from the group consisting of Omni reflectors, Bragg gratings, directional couplers, and combinations thereof.

* * * * *